United States Patent [19]

Foggini

[11] Patent Number: 4,525,008
[45] Date of Patent: Jun. 25, 1985

[54] SWIVEL ATTACHMENT FOR AUTO VEHICLE ADJUSTABLE SUN VISORS

[75] Inventor: Giovanni Foggini, Turin, Italy

[73] Assignee: Lear S.n.c. di Foggini & C., Orbassano, Italy

[21] Appl. No.: 479,538

[22] Filed: Mar. 28, 1983

[30] Foreign Application Priority Data

Apr. 9, 1982 [IT] Italy .................. 67475 A/82

[51] Int. Cl.$^3$ .................................................. B60J 3/02
[52] U.S. Cl. ...................................... 296/97 K; 403/94
[58] Field of Search .............. 296/97 K, 97 J, 97 R; 403/94, 96, 93, 91

[56] References Cited

U.S. PATENT DOCUMENTS

| | | | |
|---|---|---|---|
| 1,880,582 | 10/1932 | Thorp | 296/97 K |
| 2,167,962 | 8/1939 | Souis | 296/97 K |
| 3,228,722 | 1/1966 | Clare | 296/97 R |
| 3,360,296 | 12/1967 | Hatch | 296/97 R |
| 3,374,031 | 3/1968 | Dully | 296/97 R |
| 4,377,020 | 3/1983 | Vigo | 296/97 K |

*Primary Examiner*—Robert R. Song
*Attorney, Agent, or Firm*—Guido Modiano; Albert Josif

[57] ABSTRACT

The attachment comprises a body of polymeric material wherein a through socket is formed rotatively holding one end of the visor suspension rod, which end is formed with a cranked portion engaged by two opposite cheeks of the supporting body, extending through an arc at least as wide as the adjustment angle of the suspension rod, and effective to limit the angular travel range of the visor suspension rod cranked portion.

10 Claims, 21 Drawing Figures

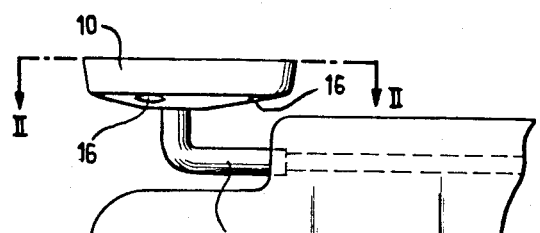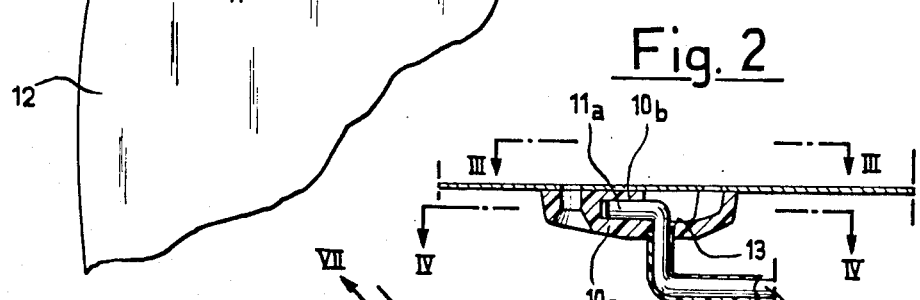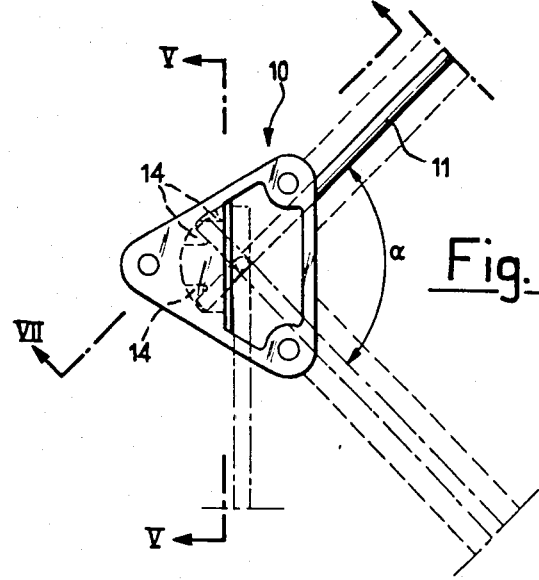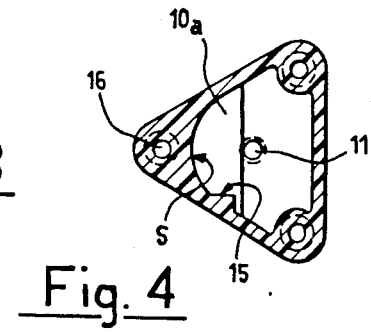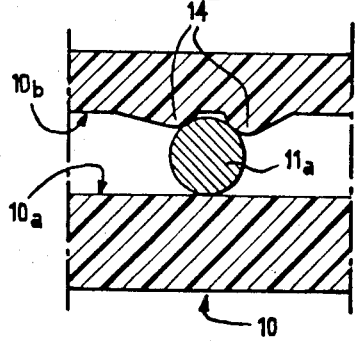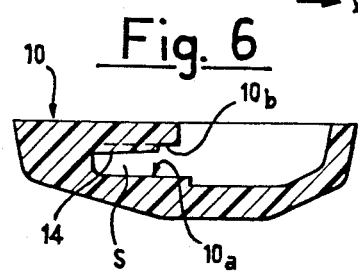

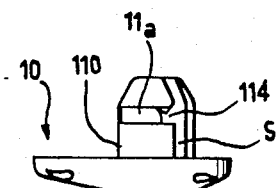
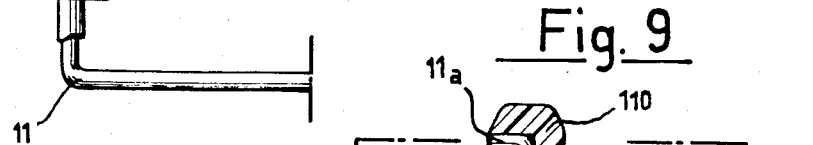
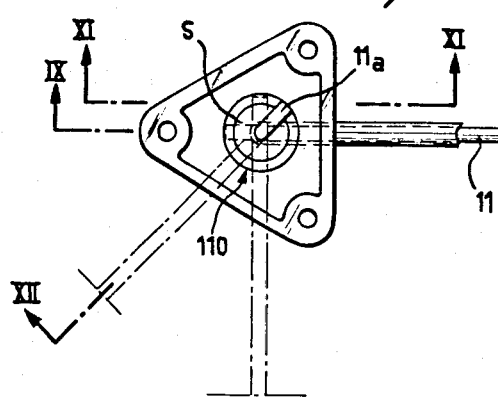
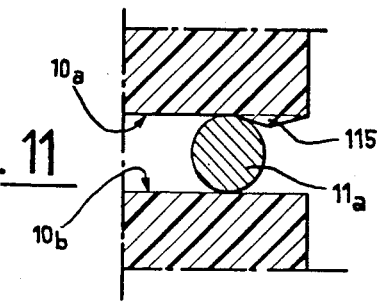
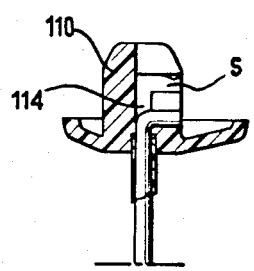
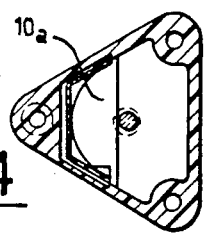
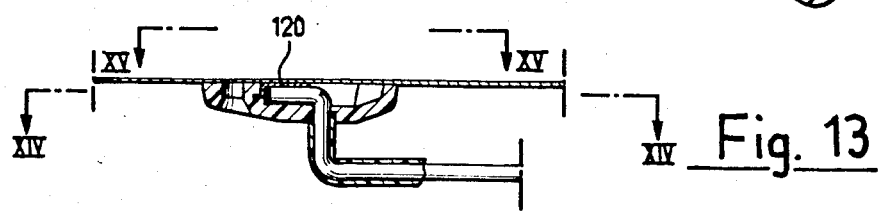

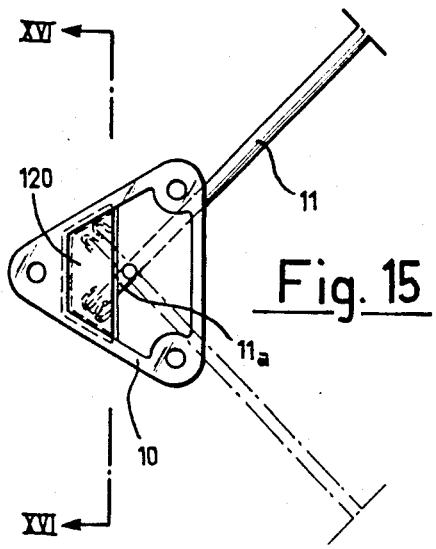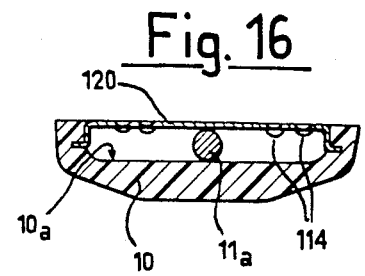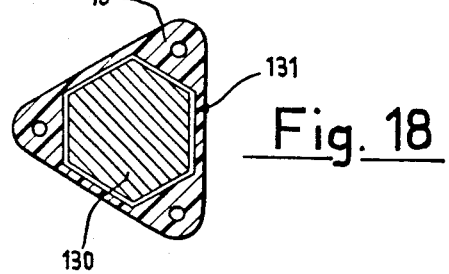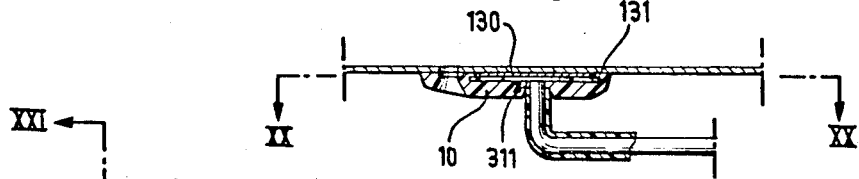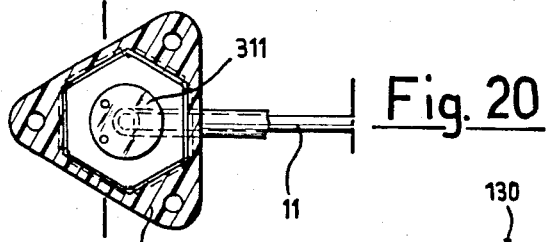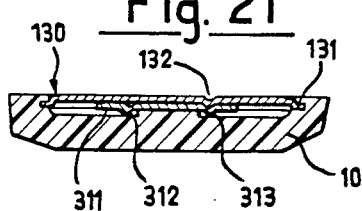

SWIVEL ATTACHMENT FOR AUTO VEHICLE ADJUSTABLE SUN VISORS

BACKGROUND OF THE INVENTION

This invention relates to a swivel attachment for automobile vehicle adjustable sun visors.

With adjustable sun visors, that is sun visors which may be swung to lay against the windshield and adjoining side window, it is common practice to use swivel attachments comprising a spring which, by fitting onto the visor suspension rod hinge connection end under adequate preload, provides the required rod retention couple to make the front or side working positions of the visor stable. Also known are swivel attachments wherein the rod hinge connection end is simply stuck in a socket of an attachment formed from a polymeric material; the retention couple being here provided merely by the friction force developed between the different materials of the rod and attachment in which the respective socket is formed.

Both these prior swivel attachments have drawbacks, and especially the former type, including a spring, an excessively complicated construction resulting in excessively high manufacturing costs, while the latter type, relying simply on friction, is not fully satisfactory function-wise, mainly on account of the mechanical characteristics of the polymeric material changing with temperature. Moreover, both such prior swivel attachments have the disadvantage of occupying much space axially, so that a recessed seat must be provided in the car body sheet metal surface.

SUMMARY OF THE INVENTION

Accordingly, the task of the present invention is to remove such prior deficiencies by providing a swivel attachment for adjustable sun visors as specified, which can achieve the following objects:
- a simplification over prior structures, with an attendant significant lowering of costs;
- an effective retention of the rod in the two, front and side, working positions of the sun visor;
- making the swivel behavior unaffected both by wear and temperature variations; and
- a significant reduction of the swivel space requirements, so as to make the provision of a recessed seat in the car body plate unnecessary.

A further object of the invention is to provide a swivel attachment so constructed as to enable it to be manufactured and assembed through automated methods particularly suitable for mass production.

According to one aspect of the invention, the above task and object as well as yet other objects, such as will be apparent hereinafter, are achieved by a swivel attachment for automobile vehicle adjustable sun visors, characterized in that it comprises a body of a polymeric material having a throughgoing socket holding, with allowance for rotation, the end of the visor suspension rod, which end carries a cranked projection engaged by two opposing cheeks of the supporting body extending through an arc at least as wide as the adjustment angle of said rod, said opposing cheeks acting in elastic contact engagement with said projection to brake, by resisting it, the angular travel range thereof.

According to another aspect of the invention, that end portion of the rod which projects beyond the throughgoing socket is cranked to form the projection cooperating in contact engagement with the opposing cheeks of the attachment body.

According to yet another aspect of the invention, the projection is provided in the form of an either rigid or elastic foil inserted at the end of the rod portion extending through the socket in the attachment body. The opposing cheeks are, in turn, formed in a single piece from the polymeric material of the support, or in accordance with an alternative embodiment, one cheek is formed in the body material, and the other, opposing it, comprises a metal or non-metal insert portion which acts as an elastic element for contact engagement with the rod projection. The opposing cheeks, irrespective of their construction, are also provided with locating notches which snap engage with the rod projection at least at the end positions of the sun visor adjustment sector.

BRIEF DESCRIPTION OF THE DRAWINGS

Further features and advantages will be more clearly understood from the following detailed description, with reference to the accompanying drawings, given herein by way of illustration only, and where:

FIG. 1 is an elevation view of the attachment;

FIG. 2 is a cross-sectional view taken along the line II—II of FIG. 1;

FIG. 3 is a plan view taken in the direction of the arrow III—III of FIG. 2;

FIG. 4 is a sectional view taken along the line IV—IV of FIG. 2;

FIG. 5 is a sectional view taken along the line V—V of FIG. 3;

FIG. 6 is a sectional view taken along the line VI—VI of FIG. 5;

FIG. 7 is an enlarged scale sectional view taken along the line VII—VII of FIG. 3;

FIG. 8 is a side elevation view of one embodiment of this attachment;

FIG. 9 is a cross-sectional view of the attachment body taken along the line IX—IX of FIG. 10;

FIG. 10 is a cross-sectional view taken along the line X—X of FIG. 9;

FIG. 11 is an enlarged scale sectional view taken along the line XI—XI of FIG. 10;

FIG. 12 is a sectional view, taken along the line XII—XII of FIG. 10;

FIG. 13 is a cross-sectional view similar to FIG. 2, showing a further embodiment;

FIG. 14 is a sectional view taken along the line XIV—XIV of FIG. 13;

FIG. 15 is a plan view taken in the direction of the arrows XV—XV of FIG. 13;

FIG. 16 is a sectional view taken along the line XVI—XVI of FIG. 15;

FIG. 17 is a sectional view similar to FIG. 2, showing another embodiment;

FIG. 18 is a sectional view taken along the line XVIII—XVIII of FIG. 17;

FIG. 19 is a sectional view similar to FIG. 2, showing yet another embodiment;

FIG. 20 is a sectional view taken along the line XX—XX of FIG. 19; and

FIG. 21 is a sectional view taken along the line XXI—XXI of FIG. 20.

DESCRIPTION OF THE PREFERRED EMBODIMENTS

Making initial reference to FIGS. 1 to 7, the numeral 10 designates this swivel attachment and 11 designates the suspension and adjustment rod for the sun visor 12 which is secured to said rod, in any conventional manner, for a tilting movement from a home position adjacent the vehicle roof panel to a working one adjacent the window, and vice versa.

According to the invention, the attachment 10 comprises a body of a polymeric material, wherein a throughgoing socket 13 is provided to accommodate the journalled end of the rod 11, which end engages pivotally with said socket. The rod portion 11a which protrudes beyond the socket is cranked to form a projection being engaged, for frictionally controlled angular movement, by two opposing cheeks 10a-10b of the body of the attachment 10. The cheeks define a retention space S in the shape of an angle sector, wherein the projection 11a moves, the width of the sector being at least equal to the angular travel range α of adjustment of the rod 11. Further, the distance between the opposing cheeks is selected to be just smaller (0.1-0.2 mm) than the diameter (or thickness) of the projection 11a, so that the latter is braked in its movements by the friction created by the elastic contact engagement with the cheek surfaces.

Provided at the ends of the segment S, on one or both cheeks 10a-10b, are embossed locating detents 14 positioned at least at the positions reached by the projection 11a in relation to the two adjustment positions (shown in dash lines in FIG. 3) of the visor 12, respectively to the front and side. Moreover, a stop 15 is provided at one end of the segment for the projection. The other end of the segment is, instead, open to allow the projection to be inserted between the cheeks 10a-10b after its cranking. The body 10, the bottom whereof is flat, is provided with holes 16 accommodating screws for fastening to the car body sheet metal.

In the embodiment of FIGS. 8 to 12, which is suitable for installations having a preformed seat in the car body sheet metal, the attachment 10 comprises a cylindrical body 110 having the throughgoing socket 113 for the rod end and a radial groove 114 for passing the projection 11a during the assembling step (FIG. 12). Said radial groove being in communication with a space S in th shape of a part of a circle, wherein the cranked projection 11a is received for angular movement. The space S, which is also delimited by two opposing surfaces engaging with the cranked projection, has a stop 115 and locating notches (not shown), similar to those described above.

FIGS. 13 to 16 illustrate an embodiment wherein one of the cheeks engaging the projection 11a comprises a small metal plate 120 secured to the body 10 of the attachment by comolding with the body itself. The metal plate, advantageously a steel one, has a trapezoidal profile and overlies the cheek 10a, at the area corresponding to the part of a circle S wherealong the projection 11a is arranged to move. Dished out of the plate are the locating bosses 114 with which the projection engages snap-fashion owing to the elasticity of the metal.

In the embodiment of FIGS. 17 and 18, the plate 120 is replaced with a cover 130, which may be of metal or otherwise, snap fitted into a corresponding frame or seat 131 in the body 10. Formed on the inside surface of the cover, similarly to the above, are the locating bosses snap engaged by the projection 11a.

Shown in FIGS. 19 to 21 is a further embodiment wherein the cranked projection 11a is replaced with a member which may be a small disk (or small foil) 311 affixed as by welding, riveting, or threading onto the end 11a of the rod 11. The small disk 311 is in surface contact with the cover 130, which may also be made of metal or otherwise, and is preferably snap fitted into a specially provided frame 131 on the body 10. Dished out of the cover 130, if of metal construction, is a locating boss 132 adapted to cooperate with corresponding dished out portions 312-313 of the small disk 311.

Of course, based on the same principle, the invention details and embodiments may be further changed with respect to what has been described and illustrated by way of example and not of limitation, without departing from the invention scope.

I claim:

1. A swivel attachment for automobile vehicle adjustable sun visors, including a suspension rod having an end, comprising a supporting body of a polymeric material having a throughgoing socket holding, with allowance for rotation, an end of said visor suspension rod, defining a cranked projection, in spaced relationship within two opposing cheeks formed within said body, and having an inside hollow space extending through an arc at least as wide as the adjustable angle of said visor suspension rod, said two opposing cheeks of said supporting body being engaged by said cranked projection and acting in elastic contact engagement with the same, so as to control the angular travel throughout the range of movement thereof.

2. A swivel attachment as claimed in claim 1, wherein said end portion of said visor suspension rod protruding beyond said throughgoing socket in said supporting body is cranked to form a projection co-operating in contact engagement with said two opposing cheeks of said body.

3. A swivel attachment as claimed in claim 1, wherein said end of said visor suspension rod defines a projection co-operating with said two opposing cheeks of said supporting body comprising a member affixed to said end of said rod portion led through said socket in said supporting body.

4. A swivel attachment as claimed in claim 1, wherein said two opposing cheeks are monolithically formed from the polymeric material of said supporting body.

5. A swivel attachment as claimed in claim 1, wherein one of said two opposing cheeks engaging said cranked projection at said end of said visor suspension rod is formed from the material of said supporting body, and the other cheek, opposing the former, comprises said opposing cheek made as an insert, acting as an elastic element for contact engagement with said cranked projection.

6. A swivel attachment as claimed in claim 5, wherein said opposing cheek comprises at least one portion of a metal foil assembled by comolding with said supporting body.

7. A swivel attachment as claimed in claim 5, wherein the said opposing cheek comprises a cover which closes the bottom of said supporting body by snap fitting into a corresponding frame in said supporting body.

8. A swivel attachment as claimed in claim 1, wherein at least one of said two opposing cheeks is provided with locating bosses which snappingly engage with said rod projection at least at the end positions of the visor adjustment range.

9. A swivel attachment as claimed in claim 1, comprising a substantially cylindrical supporting body wherein said throughgoing socket for said end of said visor suspension rod is formed, including a radial groove for passing the cranked projection; the groove being in communication with said inside hollow space having the shape of a part of a circle wherein said cranked projection is housed with allowance for angular displacement.

10. A swivel attachment as claimed in claim 1, wherein the spaced distance relationship between said two opposing cheeks is selected, so to be just smaller than the diameter, or thickness, of said rod cranked projection, whereby said projection is slightly braked in its travel range by the friction created by the elastic contact engagement with the cheek surfaces.

* * * * *